United States Patent

[11] 3,569,686

| [72] | Inventor | Leo Comorau |
| | | Long Island City, N.Y. |
| [21] | Appl. No. | 755,887 |
| [22] | Filed | Aug. 28, 1968 |
| [45] | Patented | Mar. 9, 1971 |

[54] CALCULATOR FOR COMPETITIVE EVENTS
6 Claims, 3 Drawing Figs.

[52] U.S. Cl. ..................................................... 235/193,
235/184
[51] Int. Cl. ................................................. G06g 7/00,
G06g 7/48
[50] Field of Search ........................................... 235/193,
184, 194, 195, 196, 197

[56] References Cited
UNITED STATES PATENTS
3,018,050  1/1962  Barrell ........................... 235/193
3,070,308  12/1962  Fleischer et al. ............... 235/193
3,270,190  8/1966  Cambert ....................... 235/194
3,406,281  10/1968  Buchanan et al. ............. 235/193

*Primary Examiner*—Malcolm A. Morrison
*Assistant Examiner*—Joseph F. Ruggiero
*Attorney*—Albert F. Kronman

ABSTRACT: A calculator for determining the probable results of any competitive event such as a horse race. A calculating circuit is provided for each entry and a terminal voltage is provided which is responsive to at least three known ratings of the entry. The rating values are entered into each calculating circuit by an operator and, when all the circuits have been adjusted, a dial switch is turned and a relay system lights three lamps, indicating which entry will probably win the event. Second and third ratings are also shown.

INVENTOR.
LEO COMORAU
BY *Albert H. Kronman*
ATTORNEY

CALCULATOR FOR COMPETITIVE EVENTS

BACKGROUND OF THE INVENTION

In every competitive contest, whether it be a horserace, footrace, or car race, there are certain factors and characteristics of each competitor known before the race starts. If these factors are known with sufficient accuracy and if they can be combined in the proper manner, the probable winner of the contest can be determined.

Many attempts have been made in the past to calculate the relative merits of one or more contestants. Generally, this has been done by manual arithmetic methods where both the judgment and the prejudice of the operator are liable to play an important part in the final results.

The present invention is not subject to human whims and opinions. The operator enters the known facts regarding the contestants into an electric analogue calculator and then turns a dial switch. The probable winner is indicated by a lighted lamp of one color, the probable second and third place contestants are also indicated by lamps having distinctive colors. In this manner, the operator can tell in one or two minutes the results of a contest, without manual computations, and devoid of prejudice.

One of the features of the invention is the use of a plurality of voltage dividers which are set by a key to a known characteristic of the competitor. After setting, each voltage divider is locked into place.

Another feature of the invention is the use of a "ramp" voltage which is applied to all the arrays of voltage dividers. The "ramp" voltage is generated by a constant current applied to a capacitor. By adjusting the capacitor value, any desired linear increase in current with time can be attained.

Another feature of the invention includes latching circuits for all the relays so that a lighted lamp will continue to indicate its information until the operation is finished and the main battery switch is opened.

For a better understanding of the present invention, together with other details and features thereof, reference is made to the following description taken in connection with the accompanying drawings.

DESCRIPTION OF THE PREFERRED EMBODIMENT

Figures 1, 2:
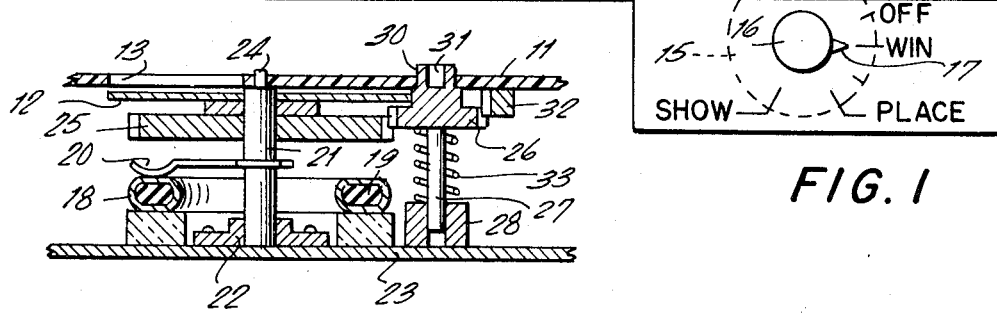
FIG. 1 is a plan view of the calculator box showing the rating dials, the indicator lamps, and the dial switch.
FIG. 2 is a cross-sectional view of one of the rating voltage divider arrangements including the key setting means and the indicator dial.

The entire calculator is shown in FIG. 1 where ratings and results are available for six competitors. Many more entries can be added to the calculator by adding extra circuits. The calculator components are enclosed in a box 10 which is divided into six segments, each containing a calculating circuit. A front panel 11 includes printed indicia to identify the entries and the results and for each rate setting dial 12, there is a window 13 to inform the operator what the dial setting is. Near the right hand edge is a series of windows 14, each having a lamp positioned under it to show the results. The lamps may be colored but this is not necessary since the first, second, and third positions are clearly indicated. At the bottom of the box 10, a dial switch 15 is positioned for operating the device after the voltage dividers have been set. The dial switch 15 includes a knob 16 and a pointer 17 to indicate the setting. The dial switch has six positions which include an OFF position, a WIN position, a PLACE, and a SHOW. Intermediate between the WIN, PLACE and SHOW positions are two other positions which are not designated on the front panel. These positions together with the OFF position are for discharging a capacitor in order to condition the circuit for the next calculation proceedings.

FIG. 2 shows some of the details of each voltage divider. In addition to the dial indicator 12 and the window 13, each voltage divider includes a resistor 18 mounted on a toridial insulator 19 and a movable contact means 20 which is secured to an insulated shaft 21. The shaft 21 is rotatably mounted in a lower bearing 22 secured to a base panel 23. The upper end of shaft 21 includes a small pin 24 which turns in a hole in the upper panel 11. Also secured to shaft 21 is a gear 25 which meshes with a pinion 26 positioned near its circumference. The pinion 26 is secured to a shaft 27 which turns in a bearing 28 secured to the lower panel 23. The upper portion of bearing 26 includes a stub shaft 30 formed with a recess 31 which may be square to accommodate an operating key (not shown) which is inserted into the recess in order to turn the pinion. The pinion 26 is resiliently held in the position shown in FIG. 2 where one side of the pinion teeth are meshed with the teeth on gear 25. On the other side of the pinion the teeth are meshed with a lock 32, secured to the upper panel 11 and maintaining both the pinion 26 and the gear 25 in a normally locked position. When the operator wishes to set the voltage divider, the key is entered into depression 31 and the pinion is pushed downwardly in order to disengage the pinion teeth from the teeth on lock 32. Then the operator turns the pinion 26 and the gear 25 until a desired setting is observed on dial 12 through window 13. Then the key is removed, the pinion is forced upwardly into its locked position by spring 33 and the operator moves to another voltage divider for providing it with a rating setting.

After all the voltage dividers have been properly adjusted, a main switch 34 is thrown to its ON position and knob 16 is moved to the WIN position. In less than one-half second a lamp will be lighted under one of the windows 14, this lamp indicating the most probable winner of the contest. Next, the knob 16 is moved to the PLACE position and in another half second, the second PLACE contestant is indicated by the lighting of a lamp under a window 14 in the PLACE column. Finally the knob 16 is moved to the SHOW position and a lamp is lighted, as before, to indicate the third contestant. After this the main switch 34 is turned to the OFF position and the knob 16 is turned back to its OFF position. The calculator is now normalized and is ready for a second computer action.

Figure 3:
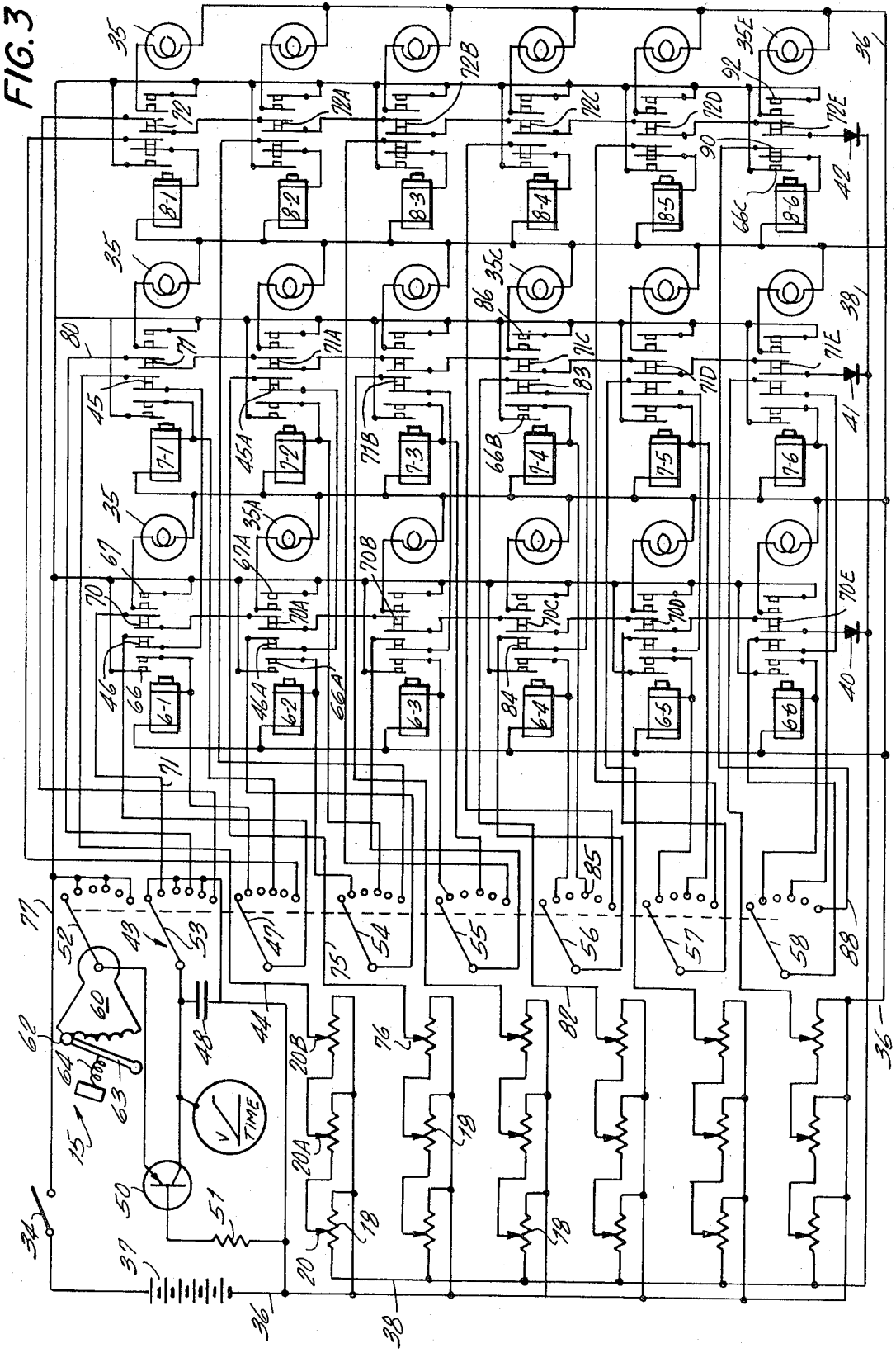
FIG. 3 is a schematic diagram of connections of the entire circuit showing the voltage dividers, the dial switch connections, the relays, and the indicator lamps.

The circuit shown in FIG. 3 indicates the diagram of connections which may be used to receive the voltages generated by the voltage dividers 12 and light the lamps 35 which indicate the probable placing of the contestants in the contest. As shown in FIG. 1, the first voltage divider may be adjusted to a value which is responsive to the race record of a contestant. The second voltage divider may be adjusted to a value which indicates the relative rating of a jockey if this is a horserace, or to some other characteristic which can influence the outcome of the contest. The third voltage is set at a value which represents some other characteristic which will influence the result, such as the weight to be carried by the horse in a race. Various other factors such as the condition of the track, the length of the race and the temperature may be computed and used to change one of the values such as the race record.

As shown in FIG. 3, the right-hand end of each voltage divider is connected to a negative conductor 36 which is connected to the negative terminal of a battery 37. The positive ends of the first voltage dividers are connected to a common conductor 38 which is connected in series with three diodes 40, 41, and 42 and a series of normally closed contacts operated by relays. Each series of relay contacts is terminated by one of three contacts on a dial switch 43 which is moved in synchronism with all the other dial switches and knob 16.

The second series of voltage dividers has its left terminal connected to the movable contact 20 on the first voltage divider and the third series of voltage dividers is connected in a similar way with its left-hand terminal connected to the moving contact on the second voltage divider. The third set of voltage dividers has its moving contact connected in series with two normally closed relay contacts, the purpose of which will be explained in detail later.

It is obvious from the above description and from FIG. 3 that the terminal voltage on conductor 44 is the product of three factors each representing a percentage decrease of the voltage applied to common conductor 38. The resultant voltage on conductor 44 is connected in series with two relay contacts 45 and 46 and then applied to a switch arm 47 which moves in synchronism with the dial switch 15 and which sends this voltage to any one of the relay windings 6—1, 7—1, or 8—1, depending upon the placing of the switch arm 47. Each of the computing circuits is connected in a similar manner, each having a switch arm and each having three relays with similar contacts. Each of the computing circuits also has three lamps 35 to indicate a first, second, or third probable placement.

The voltage applied to each array of voltage dividers is derived from a transistor circuit which develops what is generally termed a "ramp" voltage. This voltage is produced by applying a constant current to a capacitor 48. The constant current is generated by a transistor 50 having its base connected to the negative terminal of battery 37 in series with a resistor 51. The emitter of transistor 50 is connected to the first switch arm 52 of the dial switch and is connected to no other part of the circuit when the dial switch is in the OFF position. However, when the dial switch is turned to the first or WIN position and when the main switch 34 is closed, the positive terminal of the battery 37 is connected to the emitter electrode of the transistor and this sends a constant current to charge capacitor 48 in a linear manner. The effect of this charging current is to raise the potential across the capacitor in a linear manner and to apply a linear increasing voltage to the second arm 53. When arm 53 is in the second, fourth, or sixth positions the constant increasing voltage is applied to one of the normally closed contacts in the first, second, or third array of relays and this voltage is subsequently applied through diodes 40, 41, or 42 to the left-hand terminal of the voltage dividers by way of conductor 38. When arm 53 is in the first, third, or fifth position, the capacitor 48 is short-circuited and its voltage is reduced to zero.

The dial switch 15 has eight arms, arms 52 and 53 for regulating the generated voltage and arms 47 and 54 through 58 for applying the resultant voltage from the voltage dividers 18 to one of the arrays. All of the switch arms are connected to a detent segment 60 formed with a series of depressions 61 which are engaged by a detent wheel 62 on the end of an arm 63. The arm is resiliently stressed by a spring 64 to make contact with the depressions 61 and retain the switch arms in a definite position so that the arms will make contact with one of the six stationary contacts for a short time interval during the operation of the switch.

As shown in FIG. 3, there are six calculating circuits for determining the first, second and third places in a contest. Each calculating circuit is provided with three lamps 35 which show the result of the calculation. Each lamp is controlled by a relay, there being eighteen lamps 35 and eighteen relays. The relay windings for the WIN position are designated 6—1 through 6—6, the windings for the PLACE position are designated 7—1 through 7—6 and windings for the SHOW position are designated 8—1 through 8—6. All the relays are provided with a pair of normally open latching contacts 66 which retain the relay in its operated condition until the main switch 34 is opened. Also every relay is provided with a pair of normally open lamp contacts 67 which light the associated lamp 35 when the relay is actuated.

In order to prevent the actuation of more than one relay in any of the WIN or PLACE positions, a series of normally closed disabling contacts 70 are provided. Contacts 70 in relay 6—1 are connected by means of conductors 71 to the second contact on dial switch 43, these contacts also being connected in series with contacts 70a, 70b, 70c, 70d, and 70e, the last-designated contact being connected through diode 40 to conductor 38 and the positive side of all the arrays of voltage dividers 18. It is obvious that when any relay in the WIN array is actuated, the series circuit is broken and all other WIN relays are disabled. This disabling circuit prevents the calculating device from indicating more than one contestant to win.

A similar disabling circuit is a part of all the relays in the PLACE position, these normally closed contacts designated 71 through 71e. In a similar manner all the SHOW relays 8—1 through 8—6 are provided with similar normally closed contacts 72 through 72e. Each of these series of disabling contacts are connected between a contact on dial switch 43 and conductor 38 in series with a diode.

Each of the WIN relays 6 and the SHOW relays 7 are also provided with disabling contacts 45 and 46 connected in series between the third sliding contact 20b and the switch arm associated with that calculating circuit. For the first calculating circuit the switch arm is 47. Contacts 45 and 46 prevent the actuation of a PLACE or SHOW relay after the WIN relay has been operated. Since all the relay contacts for all the relays are similar and since each operates in a similar manner, the remaining relays will be described only when the operation of the circuit is described.

The operation of this circuit is as follows: as described above with switch 34 in its open position, the operator sets all the voltage dividers 18, using available data relating to each contestant. Then with switch 15 in the OFF position the main switch 34 is closed. Next, the operator turns switch 15 to the first contact so that the capacitor 48 has its short circuit connection removed and the full voltage of battery 37 is applied to the emitter electrode of transistor 50. At this time arms that all the windings in the WIN column are connected to the third variable contact in the voltage dividers. The constant current supplied by transistor 50 produces a linear increase in voltage across capacitor 48 and raises the voltage on conductor 71. This voltage is transmitted through all six contacts 70 and diode 40 so that a rising potential is presented to all the voltage dividers 18. Since the voltage dividers 18 are all set at different values, there will be one output conductor 75 connected to variable contact 76 which carries a voltage higher in potential than any other conductor coupled to the other voltage dividers. Assuming that the voltage on conductor 75 is higher than the others, relay 6—2 will be actuated by means of a circuit which can be traced from contact 76, over conductor 75, through contacts 45a and 46a, to arm 54 which is now resting on its second contact. This voltage is thereby applied to relay 6—2, causing it to become actuated, closing latching contacts 66a, opening contacts 46a and 70a and closing load contacts 67a, thereby lighting lamp 35a. When contacts 66a are closed, relay 6—2 is retained in its actuated condition because contacts 66a apply a positive voltage from positive conductor 77 to the relay winding. When contacts 46a are opened, a circuit is broken which extends from arm 54, the fourth contact on this switch, and relay through winding 7—2, preventing the second relay for actuation. When contacts 70a are opened the disabling circuit through all contacts 70 is opened so that no other WIN contact can be actuated. The closure of contacts 67a light lamp 35a and indicate that the second entry is the most probable winner.

Next, switch arm 52 is turned to its third contact which cuts off the positive supply voltage to the transistor. At the same time, arm 53 moves to its third contact and short circuits capacitor 48, reducing its voltage to zero. Next, all the switch arms are moved to the fourth contact. Switch arm 52 again supplies positive voltage to transistor 50 and starts the charging of capacitor 48, again raising the voltage of arm 53 and the conductor 80. The voltage and current through conductor 80 is passed through all the closed contacts 71, diode 41, and all the voltage dividers which have a connection to the battery 37. As the voltage rises across the capacitor 38, the highest voltage presented by one of the voltage dividers will be applied through normally closed contacts 45 and 46 until one of the PLACE relays is actuated. None of the WIN relays can be actuated because contacts 70a have been opened and relays 7—2 and 8—2 cannot be actuated because contacts 46a have been opened.

Let it be assumed that the output voltage on conductor 82 is higher than similar conductors leading from the other voltage dividers. This voltage is applied through contacts 83 and contacts 84 to switch arm 56 which is now on the fourth contact 85. This voltage is thereby applied to winding 7—4 closing latching contacts 66b and opening contacts 83 and 71c. At the same time, contacts 86 are closed to light lamp 35c. All the WIN relays and all the PLACE relays have now been removed from the circuit by the opening of normally closed contacts which are connected in series with their windings. The operator next moves all the switch arms to the fifth position which discharges capacitor 48, and then to the sixth position which applies a rising voltage to all the relays 8—1 through 8—6. One of these circuits can be traced from switch arm 58 over conductor 88 through closed contacts 90, to relay winding 8—6 and the negative conductor 36. The actuation of this relay closes latching contacts 66c and load contacts 92 to hold the relay in its operating condition and to light lamp 35e.

It will be apparent from the above description that the successive operation of the dial switch 15 applies voltage to the WIN, PLACE and SHOW relays. Each time a relay is operated, some of its contacts disable all the other WIN relays while other contacts disable the other relays in the same calculating circuit. The result is that three lamps are lighted, indicating the first, second, and third probable finishers in the contest. The latching circuits retain the lamps 35 in their lighted condition until the main switch 34 is opened.

I claim:
1. A calculator for competitive events comprising:
   a. a constant current generator in series with a capacitor and a source of direct current power for generating a voltage which increases in a linear manner with time;
   b. a plurality of calculator circuits, one for each competitor, each including;
      1. three relays representing a first, second, and third place for actuation by said linear voltage generator to indicate a probable order of finish in a competition prior to its occurrence;
      2. an indicator means coupled to each relay for showing the results furnished by the calculator circuit;
      3. each of said relays including a winding, a pair of latching contacts for retaining the relay in its operated condition after its actuation, a pair of load contacts for applying current to its associated indicating means, a first pair of normally closed contacts for opening a first disabling circuit connected in series with the generator for disabling similar first place relays in the other calculator circuits, and a second pair of normally closed contacts for opening a second disabling circuit connected in series with said generator for disabling other relays in the same calculator circuit; and
      4. a plurality of settable voltage dividers connected in series with each other, each of said dividers adjustable by an operator to a value which indicates a known characteristic of a competitor;
   c. a plurality of dial switches, one for each calculator circuit, for sequentially applying the generator voltage to the first, second, and third place relay windings in series with their associated voltage divider circuits; and
   d. a manually operable control means coupled to all the dial switches for alternately energizing the constant current generator to determine a probable result and then short circuiting the capacitor.

2. A calculator as claimed in claim 1 wherein said constant current generator includes a transistor having its emitter connected to the positive terminal of the source of direct current power, its base connected to the negative terminal of the source of power in series with a resistor, and its collector connected in series with a capacitor.

3. A calculator as claimed in claim 1 wherein said indicating means is a lamp.

4. A calculator as claimed in claim 1 wherein each of said disabling circuits includes a semiconductor diode.

5. A calculator as claimed in claim 1 wherein each of said voltage dividers includes a variable contact turned by a gear, a pinion for the gear, and a locking means for the pinion.

6. A calculator as claimed in claim 1 wherein said manually operable control means includes a series of detents for momentarily restraining the control means to dwell at desired contacts so that the calculator circuits can energize the proper relay and the capacitor can be fully discharged.